United States Patent Office 2,904,553
Patented Sept. 15, 1959

2,904,553

THIOCARBONIC ACID ESTERS AND THEIR PRODUCTION

Klaus Sasse, Koln-Stammheim, Richard Wegler, Leverkusen, and Ferdinand Grewe, Koln-Stammheim, Germany, assignors to Farbenfabriken Bayer Aktiengesellschaft, Leverkusen, Germany, a corporation of Germany No Drawing. Application August 12, 1957
Serial No. 677,784

Claims priority, application Germany August 23, 1956

8 Claims. (Cl. 260—326)

This invention relates to and has as its objects N-thiocarbonic acid esters of cyclic dicarboxylic acid imides and their production. Generally the new compounds of the present invention may be represented by the following formula

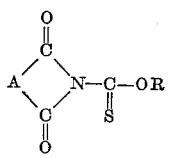

in which A stands for an organic radical of an aliphatic, aromatic or heterocyclic dicarboxylic acid, and R stands for alkyl-, aralkyl- or aryl radicals.

The reaction of cyclic dicarboxylic acid imides with organic carboxylic acid halides is known from the literature, as it is described by Heller and Jacobsohn in Ber. der deutschen chemischen Gesellschaft, vol. 54, page 1112 (1921), or by Titherley and Hicks in the Journ. of the Chemical Society 89, 709, or by Aschan, in Ber. der deutschen chemischen Gesellschaft 19, 1400 (1886). These compounds have been tested against fungi, but their fungicidal properties were very low.

In accordance with the present invention it has now been found a new class of compounds, which correspond to the above mentioned formula and which exhibit very remarkable fungicidal properties. Generally these compounds may be obtained by reacting cyclic dicarboxylic acid imides with thiocarbonic acid ester halides. This reaction is to be seen from the following formula

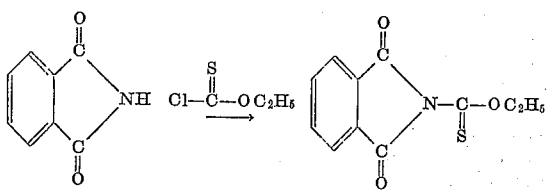

It has to be understood, however, that this formula is given by way of illustration only, and that also other cyclic dicarboxylic acid imides may successfully be used in this reaction. Other examples of those dicarboxylic acid imides are: maleic acid imide, succinic acid imide, glutaric acid imide, other aliphatic dicarboxylic acid imides, wherein the aliphatic chain is interrupted by hetero atoms, such as imino diacetic acid imide, methyl imino diacetic acid imide, diglycolic acid imide, thiodiglycolic acid imide, furthermore imides of aromatic hydroaromatic or heterocyclic dicarboxylic acids, such as the tetrahydrophthalic acid imides, endomethylen tetrahydro phthalic acid imide, hexahydro phthalic acid imide, homophthalic acid imide, naphthalic acid imide, pyridine-2.3-dicarboxylic acid imide, thiophene-2.3-dicarboxylic acid imide as well as alkyl substituted, halogene substituted, nitro substituted compounds of the above said dicarboxylic acid imides.

Other thiocarbonic acid ester halides which are suitable for the present invention are generally halides of monothio carbonic alkyl-, -aralkyl-, -aryl- or heterocyclic esters, but especially the chlorides of these thiocarbonic acid esters. Compounds of that type are: chlorides of thiocarbonic acid-, -methyl-, -propyl-, -butyl-, -amyl-, -hexyl-, -cyclohexyl-, -phenyl-, -p-tolyl-, -4-chlorophenyl-, -4-nitrophenyl-, -thienyl ester and the like. The preparation of these thiocarbonic acid ester halides is well known from the literature.

Generally the dicarboxylic acid imides are reacted in the form of their salts with the thiocarbonic acid ester halides. Especially suitable are their alkali metal or alkali earth metal salts. Furthermore the reaction should be carried out in the presence of inert solvents. The temperature range for carrying out the reaction should be between about 20 to 80° C., but sometimes lower or higher temperatures may also successfully be used.

It is also possible to react the free dicarboxylic acid imides with the thiocarbonic acid ester halides in the presence of acid binding agents, such as tert. organic amines, alkali metal alcoholates, hydroxides or carbonates, such as sodium hydroxide or potassium carbonate, and the like. In the first case the reaction preferably may be carried out in water or in aqueous organic solvents, wherein the salts of the cyclic dicarboxylic acid imides are soluble. The thiocarbonic acid ester halides in this case may be dissolved in such inert organic solvents which are also miscible with water. Such solvents are preferably acetone or dioxane. Sometimes the reaction also may be carried out only in water, using thereby emulsifiers for obtaining a homogeneous reaction medium.

Generally the compounds of the present invention are valuable fungicides, thus being able to be used as plant protecting agents. They are especially folio fungicides with a remarkable activity on green plants; thus, if a solution of N-thiocarbonic acid ethyl ester phthalimide of the following formula

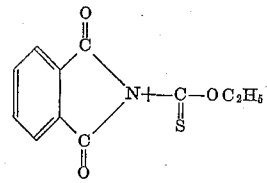

is diluted with the same amount of dimethyl formimide, then mixed with 50% by weight (of active ingredient) of a commercial emulsifier consisting of a benzyl hydroxy diphenyl polyglycol ether and further diluted with water to an aqueous solution containing 0.05% of active ingredient, tomato plants become completely protected against cladosporium fulvum; vine when sprayed with these solutions is protected against peronospora.

The following examples are given by way of illustration only, but without limiting this invention thereto.

*Example 1*

29.4 parts by weight of phthalimide are dissolved in 250 parts by weight of dioxane together with 28 parts by weight of hexahydro dimethylaniline. While stirring and cooling with ice water there are added slowly 27.5 parts by weight of thiocarbonic acid ethyl ester chloride. Afterwards the mixture is stirred for half an hour at room temperature and then half an hour at 35–40° C. The reaction mixture then is cooled down and poured into 1 liter of water. The crystals of the N-thiocarbethoxy phthalimide are recrystallized from alcohol. Yield: 78% of the theoretical, M.P. 106–108° C.

Tomato plants when sprayed or dusted with solutions or powders containing 0.05% of N-thiocarbethoxy phthalimide and when infected with cladosporium fulvum showed no growth of fungi. The same effect is to be seen at vine, which was infected with peronospora.

*Example 2*

30.2 parts by weight of tetrahydro phthalimide are dissolved in 250 parts by weight of dioxane together with 28 parts by weight of hexahydro dimethylaniline. While stirring and cooling with ice water there are added slowly 27.5 parts by weight of thiocarbonic acid ethyl ester chloride. Then the reaction mixture is stirred for half an hour at room temperature and another half an hour at 35–40° C. The reaction mixture is cooled down and poured into 1 liter of water. The separated crystals of the N-thiocarbethoxy-Δ⁴-tetrahydro phthalimide are recrystallized from alcohol. Yield: 68% of the theoretical, M.P. 84–85° C.

*Example 3*

30.6 grams of hexahydro phthalimide acid are suspended in 250 ml. of benzene together with 28 grams of hexahydro dimethyl aniline. At room temperature there are added slowly 27.4 grams of thiocarbonic acid ethylester chloride. The reaction mixture is stirred for half an hour at room temperature and another half an hour at 40–50° C. Afterwards the solution is filtered off from impurities and salts with suction and then washed with water. The benzene then is distilled off. Yield: (62.7% of the theoretical) 30.2 grams of the N-thiocarbethoxy hexahydro phthalimide in form of a light yellow oil.

*Example 4*

14.7 grams of phthalimide are dissolved in 150 ml. of dioxane together with 14 grams of hexahydro dimethyl aniline. At room temperature there are added slowly 18.5 grams of the thiocarbonic acid-2-ethoxy ethyl ester chloride. The reaction mixture is stirred for one hour at 35–40° C. and then filtered off with suction and the dioxane solution is poured into water. The product obtained is crystallized and then recrystallized from alcohol. Yield: 18 grams of N-thiocarbo-(2-ethoxy-ethoxy)-phthalimide (64.5% of the theoretical), M.P. 87–88° C.

*Example 5*

15.1 grams (0.1 mol) of Δ⁴-tetrahydro phthalimide are suspended in 150 ml. of benzene together with 8.7 grams of pyridine. At room temperature there are added slowly 12.1 grams of thiocarbonic acid methyl ester chloride. The reaction mixture is stirred for half an hour at room temperature and another half an hour at 40–50° C. Afterwards the solution is filtered off with suction and washed with water. The benzene then is distilled off. Yield: 14.8 grams of N-thiocarbomethoxy-Δ⁴-tetrahydro phthalimide (66.2% of the theoretical) as a light yellow oil.

*Example 6*

16.3 grams (0.1 mol) of endomethylen tetrahydro phthalimide are dissolved in 150 ml. of benzene together with 14 grams hexahydro dimethyl aniline. At room temperature there are added slowly 12.1 grams of thiocarbonic acid methylester chloride. The reaction mixture is stirred for half an hour at room temperature and another half an hour at 40–50° C. Afterwards the solution is filtered off with suction and washed with water.

The benzene then is distilled off. Yield: 16.3 grams (68.5% of the theoretical of N-thiocarbonic methoxy endomethylen tetrahydro phthalimide as a light yellow oil.

We claim:

1. Thiocarbonic acid esters of the following formula

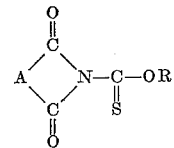

in which

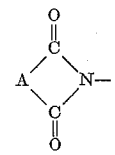

stands for a member selected from the group consisting of phthalimido, tetrahydrophthalimido, hexahydrophthalimido, and endomethylen tetrahydrophthalimido, and the alkyl-, halo- and nitro-substituted derivatives thereof, and R stands for a member selected from the group consisting of lower alkyl, lower-alkoxy-lower alkylene, cyclohexyl, phenyl, tolyl, chloro phenyl, nitro phenyl and thienyl.

2. A process for the production of thiocarbonic acid esters which comprises contacting a cyclic dicarboxylic acid imide of the following formula:

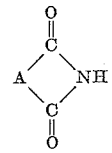

selected from the group consisting of phthalimide, tetrahydrophthalimide, hexahydrophthalimide, and endomethylyntetrahydrophthalimide, and the alkyl-, halo- and nitro-substituted compounds thereof, with a thiocarboxylic acid ester halide of the following formula:

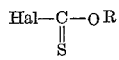

in which R stands for a member selected from the group consisting of lower alkyl, lower-alkoxy-lower alkylene, cyclohexyl, phenyl, tolyl, chlorophenyl, nitrophenyl and thienyl, and Hal stands for a member selected from the group consisting of chlorine and bromine, in the presence of an acid-binding agent.

3. N-thio-carbethoxy phthalimide.
4. N-thiocarbethoxy-Δ⁴-tetrahydro phthalimide.
5. N-thiocarbethoxy hexahydrophthalimide.
6. N-thiocarbo-(2-ethoxy-ethoxy)-phthalimide.
7. N-thiocarbomethoxy-Δ⁴-tetrahydro phthalimide.
8. N-thiocarbonic methoxy endomethylen tetrahydrophthalimide.

References Cited in the file of this patent

UNITED STATES PATENTS

| | | |
|---|---|---|
| 2,781,360 | Kleiman | Feb. 12, 1957 |
| 2,816,111 | Wegler et al. | Dec. 10, 1957 |
| 2,829,146 | Beaver et al. | Apr. 1, 1958 |